United States Patent

Wiener

[15] 3,650,771

[45] Mar. 21, 1972

[54] FLAVORING SUBSTANCES AND THEIR PREPARATION

[72] Inventor: Charles Wiener, Middletown, N.Y.

[73] Assignee: Polak's Frutal Works, Inc., Middletown, N.Y.

[22] Filed: Aug. 1, 1968

[21] Appl. No.: 749,271

[30] Foreign Application Priority Data

Aug. 15, 1967 Great Britain.....................37,445/67

[52] U.S. Cl. ........................................................99/140 R
[51] Int. Cl. .................................................A23l 1/26
[58] Field of Search....................................99/140

[56] References Cited

UNITED STATES PATENTS 2,594,379  4/1952  Barch .....................................99/140

OTHER PUBLICATIONS

T. Moeller, " Inorganic Chemistry," 515– 516, John Wiley and Sons, New York, 1953.

*Primary Examiner*—Morris O. Wolk
*Assistant Examiner*—Sidney Marantz
*Attorney*—Morgan, Finnegan, Durham & Pine

[57] ABSTRACT

Process for the preparation of flavors of onion and bacon which comprises reacting certain sulfide or hydrosulfide sulfur compounds with certain aldehydes and the products produced thereby.

8 Claims, No Drawings

FLAVORING SUBSTANCES AND THEIR PREPARATION

It has been reported (U.S. Pat. No. 2,594,379) that odors resembling various foods have been prepared by bubbling hydrogen sulfide through solutions of certain aldehydes in triethyl citrate. However, the resulting products of this process are not of the flavor quality desired.

The present invention is new and unique, however, with respect to this process in that it is carried out in alkaline media without the use of triethyl citrate. The quality and strength of the resulting products are superior. Also, acetaldehyde when reacted via the process described in the present invention gives an onion flavor rather than a sauerkraut odor as was reported in earlier work (U.S. Pat. No. 2,594,379).

The process of this invention comprises reacting a sulfur compound selected from the group consisting of ammonium sulfide, ammonium hydrosulfide, alkali metal sulfides, alkali metal hydrosulfides, alkaline earth metal sulfides, alkaline earth metal hydrosulfides and amino hydrosulfides with (1) an aldehyde selected from the group consisting of 3-methyl butyraldehyde and 2-methyl butyraldehyde to form a product having a bacon-like flavor, or (2) an aldehyde selected from the group consisting of acetaldehyde and propionaldehyde to form a product having an onion-like flavor.

Examples of alkali metal sulfides and hydrosulfides that may be used are sodium sulfide, potassium sulfide, sodium hydrosulfide and potassium hydrosulfide. Examples of alkaline earth metal sulfides and hydrosulfides are calcium sulfide and calcium hydrosulfide. An example of an amine hydrosulfide is 2-amino ethanol hydrosulfide.

It has been found that the flavor quality is improved if the resulting reaction mixture is acidified to a pH in the range of 1 to 6 with a suitable acidifying agent (e.g., hydrochloric acid, sulfuric acid, etc.)

Factors which may affect the quality of the flavors produced include the nature and relative amounts of the aldehydes and sulfur reagents used, the amount of solvent used, and the time and temperature at which the reaction is performed.

When a solvent is used in the reaction this is usually water, glycerol or propylene glycol. The amount of any of these alone or in combination used in the reaction should be at least 1–5 percent; generally 10–30 percent is used based on the total weight of the sulfur reagent and aldehyde. Amounts of solvent of up to 5,000 times the total weight of the aldehyde plus the sulfur reagent can, however, also be used.

The reaction may be carried out at temperatures from between 0° and 200° C., usually reaction times of from 1 minute to 4 hours are used.

To obtain flavors of high quality from 0.1 mole to 10 moles of aldehyde are used per 1 mole of sulfur reagent.

Onion and bacon flavors according to this invention may be incorporated in a wide variety of products such as vegetable oils, salad dressings, cheeses, soups, crackers, etc., where either onion or bacon flavors are desired.

EXAMPLE 1

The following were mixed together and warmed at 60°–70° C. for 5 minutes:
1 g. sodium hydrosulfide
1 g. acetaldehyde
20 ml. water The mixture was cooled and acidified with concentrated HCl to pH 1 and allowed to stand uncovered 1 hour at room temperature to dispel excess hydrogen sulfide. The resulting material had a boiled onion aroma.

EXAMPLE 2

The following material was saturated with hydrogen sulfide:
10 g. 2-amino ethanol to this was added in portions and maintaining the reaction temperature between 70°–80° C.
6 g. propionaldehyde.

The mixture was stirred for 0.5 hours. This material has an onion-like odor. The mixture was then poured into 100 ml. of water and acidified to pH 1 and allowed to stand uncovered at room temperature to dispel excess hydrogen sulfide. The material thus obtained had a strong fresh onion aroma.

EXAMPLE 3

The following materials were mixed together and boiled for 5 minutes:
1 g. sodium sulfide
1 g. propionaldehyde
10 ml. water After the reaction period the material was acidified to pH 1 with concentrated hydrochloric acid and allowed to stand uncovered for 1 hour to dispel excess hydrogen sulfide. A product having an onion aroma was thus obtained.

EXAMPLE 4

The following materials were mixed together and heated at 70°–80 C. for 5 minutes:
1 g. 2-aminoethanol hydrosulfide
0.4 g. isovaleraldehyde The material had bacon-like qualities. The mixture was then poured into water and acidified to pH 3 with concentrated hydrochloric acid and allowed to stand uncovered for 1 hour to dispel excess hydrogensulfide giving a strong crisp bacon-like product.

What is claimed is:

1. A process for the preparation of a food flavor comprising reacting a sulfur compound selected from the group consisting of ammonium sulfide, ammonium hydrosulfide, alkali metal hydrosulfides, alkaline earth metal sulfides, alkaline earth metal hydrosulfides and amino hydrosulfides with an aldehyde selected from the group consisting of 3-methyl butyraldehyde and 2-methyl butyraldehyde at a temperature between 0° and 200° C. wherein the mole ratio of aldehyde to sulfur compound is 0.1:1–10:1 to form a product having a bacon-like flavor, said process being carried out in the absence of an aliphatic ester of a hydroxy polybasic acid.

2. A process according to claim 1 wherein the reaction mixture is acidified.

3. A food component prepared in accordance with claim 1.

4. The method of imparting bacon-like flavor to a foodstuff comprising treating the foodstuff with the product of claim 3.

5. A process for the preparation of a food flavor comprising reacting a sulfur compound selected from the group consisting of ammonium sulfide, ammonium hydrosulfide, alkali metal hydrosulfides, alkaline earth metal sulfides, alkaline earth metal hydrosulfides and amino hydrosulfides with an aldehyde selected from the group consisting of acetaldehyde and propionaldehyde at a temperature between 0° and 200° C. wherein the mole ratio of aldehyde to sulfur compound is 0.1:1–10:1 to form a product having an onion-like flavor, said process being carried out in the absence of an aliphatic ester of a hydroxy polybasic acid.

6. A process according to claim 5 wherein the reaction mixture is acidified.

7. A food component prepared in accordance with claim 5.

8. The method of imparting onion-like flavor to a foodstuff comprising treating the foodstuff with the product of claim 7.

* * * * *

UNITED STATES PATENT OFFICE
CERTIFICATE OF CORRECTION

Patent No. 3,650,771                    Dated    March 21, 1972

Inventor(s)  Charles Wiener

It is certified that error appears in the above-identified patent and that said Letters Patent are hereby corrected as shown below:

Column 2, line 6, change "has" to --had--

Column 2, line 26, change "80 C." to --80°C.--.

Signed and sealed this 15th day of August 1972.

(SEAL)
Attest:

EDWARD M. FLETCHER, JR.         ROBERT GOTTSCHALK
Attesting Officer               Commissioner of Patents